United States Patent
Bauer et al.

[11] Patent Number: 6,093,493
[45] Date of Patent: Jul. 25, 2000

[54] METHOD FOR THE COATING OR ENCAPSULATION OF FLUIDIZABLE SUBSTRATES

[75] Inventors: Michael Bauer, Wittnau, Germany; Carl Walter Mayer, Riehen, Switzerland

[73] Assignee: Ciba Specialty Chemicals Corp., Tarrytown, N.Y.

[21] Appl. No.: 09/100,003

[22] Filed: Jun. 17, 1998

[30] Foreign Application Priority Data

Jul. 3, 1997 [CH] Switzerland ............... 1620/97

[51] Int. Cl.⁷ ...................................... B32B 9/00
[52] U.S. Cl. ................ 428/403; 427/212; 427/213; 427/215; 427/216; 427/220; 427/221
[58] Field of Search ............... 427/212, 213, 427/215, 221, 220, 216; 546/8, 9; 568/705; 428/403

[56] References Cited

U.S. PATENT DOCUMENTS

| | | | |
|---|---|---|---|
| 4,058,401 | 11/1977 | Crivello | 96/115 R |
| 4,393,185 | 7/1983 | Berner et al. | 528/27 |
| 5,059,701 | 10/1991 | Keipert | 556/13 |
| 5,231,186 | 7/1993 | Nakano et al. | 548/107 |
| 5,247,113 | 9/1993 | Roth et al. | 556/64 |
| 5,374,697 | 12/1994 | Müller | 526/192 |
| 5,713,169 | 2/1998 | Meier et al. | 52/223.13 |
| 5,897,727 | 4/1999 | Staral et al. | 156/99 |

FOREIGN PATENT DOCUMENTS 0376884  7/1990  European Pat. Off. ........... B01J 2/00

OTHER PUBLICATIONS

Derwent Abstract 90–203216.

*Primary Examiner*—Diana Dudash
*Assistant Examiner*—Paul D. Strain
*Attorney, Agent, or Firm*—Michele A. Kovaleski

[57] ABSTRACT

A method for the reactive coating or reactive encapsulation of fluidizable, organic or inorganic, anisotropic or isotropic substrates with a cross-linking, thermostable and insoluble thermoset by spraying onto substrates a cationically curing one-pot liquid resin system comprising a cationic initiator, which method comprises fluidizing the substrates in a fluidized-bed coater at a temperature above the activation temperature of the cationic initiator and then injecting the one-pot liquid resin system into the fluidized-bed coater through a spraying device, the one-pot liquid resin system having a gelling time of from 1 to 60 seconds at from 100 to 150° C., results in unagglomerated substrates having a cross-linked, thermostable and homogeneous coating.

14 Claims, No Drawings

METHOD FOR THE COATING OR ENCAPSULATION OF FLUIDIZABLE SUBSTRATES

The present invention relates to a method for the coating or encapsulation of fluidisable, organic or inorganic substrates in a fluidised-bed coater at an elevated temperature with a reactive one-pot liquid resin system that cross-links during the coating or encapsulation.

It is known from EP-A-0 376 884 to coat substrates, for example finely divided fillers, in a fluidised bed with a curable one-pot liquid resin system, for example a curable epoxy resin mixture, thereby yielding flowable, still curable granules, which are used as compression moulding or surface-coating powders.

Furthermore, it is known from the PCT Application WO 95/29308 to provide fillers in a fluidised bed with a coating material and subsequently to dry or fully cure the coated filler granules in an oven.

It has now been found that by coating substrates, for example particles, in a fluidised bed at an elevated temperature with a cationically curable one-pot liquid resin system, coatings that are cross-linked on the particles, and therefore insoluble and very uniform, are obtained without the individual coated particles agglomerating when the coating is being cross-linked.

The phrase "one-pot liquid resin system" is known to mean a curable resin system that is relatively stable to storage at room temperature and that comprises, admixed, the curing agent and/or the curing catalyst or a curing initiator in an amount sufficient for the full cure of the resin. The reaction components, which are present in one pot, are used as a mixture in the method according to the invention.

The present invention therefore relates to a method for the reactive coating or encapsulation of fluidisable, organic or inorganic, anisotropic or isotropic substrates with a cross-linking, thermostable and insoluble thermoset by spraying onto substrates a cationically curing one-pot liquid resin system comprising a cationic initiator, which method comprises fluidising the substrates in a fluidised-bed coater at a temperature above the activation temperature of the cationic initiator and then injecting the one-pot liquid resin system into the fluidising coater through a spraying device, the one-pot liquid resin system used having a gelling time of from 1 to 60 seconds at from 100 to 150° C.

The substrates to be coated in the fluidised-bed coater may, in principle, be any kind of material capable of being fluidised, for example fibrous, granular or powdered materials. Suitable finely divided materials are therefore any such materials that can be fluidised in the fluidised-bed coater.

Organic anisotropic or isotropic substrates are known and, in some cases, are commercially available, for example natural or synthetic polymeric material, such as cellulose, preferably cotton fibres or wood flour, saturated polyesters, polyamides and melamine resins.

Suitable inorganic anisotropic or isotropic substrates are, for example, the following materials, some of which are commercially available as fillers: quartz powder, mica, talc, asbestos, slate flour, kaolin, wollastonite, chalk powder, dolomite, magnesium carbonate, gypsum, heavy spar, aluminium oxide, bentonite, silicic acid aerosol, lithopone, titanium dioxide, carbon black, carbon fibre, graphite, metal powders, especially aluminium powder, metal oxides, glass powder, glass beads, zinc sulfide, silicon carbide, cristobalite, ceramic filler or a mixture of fillers.

For the method according to the invention there are preferably used inorganic fillers, especially mineral fillers, such as more especially quartz powder, mica, slate flour, kaolin, wollastonite, gypsum, heavy spar, aluminium oxide, aluminium hydroxide, magnesium hydroxide, talc, silicic acid and bentonite, especially ceramic material.

The fillers can also be treated with an adhesion agent, which promotes binding of the thermoset to the filler particles.

Suitable one-pot liquid resin systems for the method according to the invention are, in general, such resin systems that can be fully cured by the action of heat and in the presence of a catalyst or initiator to form thermoset end products. Such resin systems are self-cross-linkable synthetic resins, which generally consist of polyfunctional monomers. At least one component in the curable one-pot liquid resin system should be liquid at the spraying temperature so that the resin system is in the form of a liquid or emulsion when it is injected or sprayed into the fluidised-bed chamber. The liquid component may be, for example, the resin itself or a portion thereof, the catalyst, the initiator or alternatively a reactive diluent or a processing aid.

In the method according to the invention there are generally used as curable one-pot liquid resin systems those based on unsaturated polyesters, epoxy resins or vinyl ether compounds.

There is preferably used as curable one-pot liquid resin system a liquid resin system comprising a cationically curable epoxy resin.

In the method according to the invention there is especially used as one-pot liquid resin system an epoxy resin comprising a latent cationic initiator.

Suitable epoxy resins are, especially, those having, on average, more than one glycidyl group or β-methylglycidyl group bound to sulfur or oxygen atoms and also cycloaliphatic epoxy resins having epoxycyclohexyl or epoxycyclopentyl groups in the molecule.

Examples of such epoxy resins are:

I) Polyglycidyl and poly(β-methylglycidyl) esters, obtainable by reaction of a compound having at least two carboxy groups in the molecule, for example an aliphatic, cycloaliphatic or aromatic polycarboxylic acid, with epichlorohydrin or β-methylepichlorohydrin. Such compounds are known and, in some cases, are commercially available, for example the diglycidyl esters of tetrahydrophthalic acid, hexahydrophthalic acid, phthalic acid and terephthalic acid.

II) Polyglycidyl or poly(β-methylglycidyl) ethers, obtainable in known manner by reaction of a compound having at least two free alcoholic hydroxy groups and/or 1 hydroxy group with epichlorohydrin or β-methylepichlorohydrin.

The glycidyl ethers of that kind are derived, for example, from acyclic alcohols, such as ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-dio, hexane-2,4,6-triol, glycerol, 1,1,1-trimethylol-propane, pentaerythritol and sorbitol, and also from polyepichlorohydrins.

They are, however, also derived, for example, from cycloaliphatic alcohols, such as 1,4-cyclohexanedimethanol, bis(4-hydroxycyclohexyl)methane and 2,2-bis(4-hydroxycyclohexyl)propane.

The glycidyl ethers can also be derived from mononuclear phenols, for example resorcinol and hydroquinone, or are based on polynuclear phenols, for example bis(4-hydroxyphenyl)-methane, 4,4'-dihydroxybiphenyl, bis(4-hydroxyphenyl)sulfone, 1,2,2-tetrakis(4- hydroxyphenylthane, 2,2-bis(4-hydroxyphenyl)propane and 2,2-bis(3,5-dibromo-4-hydroxy-phenyl)propane, or can be derived from novolaks obtainable by condensation of aldehydes, such as formaldehyde, acetaldehyde, chloral or furfuraldehyde, with phenols, such as phenol, or with phenols substituted in the nucleus by chlorine atoms or by $C_1$–$C_9$alkyl groups, for example 4-chlorophenol, 2-methylphenol and 4-tert-butylphenol, or by condensation with bisphenols, such as of the kind mentioned above.

III) Poly(S-glycidyl) compounds, for example di-S-glycidyl derivatives, which are derived from dithiols, for example ethane-1,2-dithiol or bis(4-mercaptomethylphenyl) ether.

IV) Cycloaliphatic epoxy resins, for example bis(2,3-epoxycyclopentyl) ether, 2,3-epoxy-cyclopentylglycidyl ether, 1,2-bis(2,3-epoxycyclopentyloxy)ethane and 3,4-epoxycyclo-hexylmethyl-3',4'-epoxycyclohexanecarboxylate.

In the method according to the invention there is especially used a curable cycloaliphatic epoxy resin that comprises a latent cationic initiator.

As initiators for the cationic polymerisation of the epoxy resins there are used in the method according to the invention, for example, thermally activatable initiators, such as thermally activatable 'onium salts, oxonium salts, iodonium salts, sulfonium salts, phosphonium salts or quaternary ammonium salts, that do not contain nucleophilic anions. Such initiators and the use thereof are known. For example, U.S. Pat. No. 4,336,363, EP-A-0 379 464 and EP-A-0 580 552 disclose specific sulfonium salts as curing agents for epoxy resins. Besides certain sulfonium salts, U.S. Pat. No. 4,058,401 also describes the corresponding salts of tellurium and selenium.

In the method according to the invention there are preferably used thermally activatable initiators having complex halide anions.

In the method according to the invention there are especially used as thermally activatable initiators quaternary ammonium salts as disclosed, for example, in EP-A-0 066 543 and EP-A-0 673 104, those being salts of aromatic heterocyclic nitrogen-containing bases having non-nucleophilic anions, for example complex halide anions, such as $BF_4^-$, $PF_6^-$, $SbF_6^-$, $SbF_5(OH)^-$ and $AsF_6^-$. Examples of aromatic heterocyclic nitrogen-containing bases are especially six-membered nitrogen-containing heterocycles, such as pyridine, pyrimidine, pyridazine, pyrazine and alkyl or aryl derivatives thereof, and benzo and naphtho derivatives thereof, for example picoline, lutidine, quinoline, isoquinoline, quinoxaline, phthalazine, quinazoline, acridine, phenanthridine and phenanthroline.

The following may be mentioned as specific examples of the quaternary ammonium salts preferably used:
1-methylquinolinium hexafluorophosphate,
1-methylquinolinium hexafluoroantimonate,
1-methyiquinolinium hexafluoroarsenate,
1-methylquinolinium pentafluoro-hydroxyantimonate,
1-methylquinolinium hexafluoroborate, 1,2-dimethylquinolinium hexafluorophosphate,
1-ethylquinolinium hexafluorophosphate,
1-butylquinolinium hexafluorophosphate,
1-benzoymethylquinolinium hexafluorophosphate,
1-benzoylmethylquinolinium hexafluoroantimonate,
1-benzyquinolinium hexafluorophosphate, 1,-methyl-2,3-diphenylpyridinium hexafluorophosphate, 1,2-dimethyl-3-phenylpyridinium hexafluorophosphate,
1 -benzoylmethylpyridinium hexafluorophosphate,
1-ethoxyethylquinolinium hexafluorophosphate,
2-methylisoquinolinium hexafluorophosphate,
10-methylacridinium hexafluorophosphate,
10-benzoyimethylacridinium hexafluorophosphate,
10-butylacridinium hexafluorophosphate,
5-methylphenanthridinium hexafluorophosphate,
5-benzoylmethylphenanthridinium hexafluorophosphate,
1-methylnaphthyridium hexafluorophosphate, 1-methyl-2,3-diphenylquinoxalinium hexafluorophosphate, 1,2,3-trimethylquinoxalinium hexafluorophosphate, 1,2,4,6-tetramethylpyridinium hexafluorophosphate, 1-methyl-2,4-diphenylpyrimidinium hexafluorophosphate, 1-methyl-2,5-diphenylpyridazinium hexafluoro-phosphate,
1-methylphenanthrolinium hexafluorophosphate,
5-butylphenazinium hexafluorophosphate,
1-methylquinoxalinium hexafluorophosphate and
1-benzoylmethylquinoxalinium hexafluorophosphate.

Special preference is given to the use of N-benzylquinolinium hexafluoroantimonate as quaternary ammonium salt.

When quaternary ammonium salts are used it is advantageous to use, in addition, a thermal free radical former, for example a pinacol or an ether, ester or silyl derivative thereof. Those compounds are known and can be prepared by known methods. Suitable as such compounds are, for example, 1,1,2,2-tetraphenyl-1,2-ethanediol (benzpinacol), benzpinacol dimethyl ether, diethyl ether, diisopropyl ether, diacetate, dipropionate, dibutyrate, dicaprylate or dibenzoate, 1,2-di(trimethylsiloxy)tetraphenylethane, acetophenone pinacol dimethyl ether, dipropyl ether, diacetate, divalerate or dibenzoate, propiophenone pinacol dimethyl ether, dibutyl ether or diacetate, 2,3-diphenyl-2,3-bis(triphenylsiloxy)butane and 3,4-diphenyl-3,4-bis(trimethylsiloxy)hexane.

The thermal free radical formers preferably used are pinacols, such as acetophenone pinacols or especially 1,1,2,2-tetraphenyl-1,2-ethanediol (benzpinacol).

Preference is given to the use of N-benzylquinolinium hexafluoroantimonate as thermally activatable initiator, together with 1,1,2,2-tetraphenyl-1,2-ethanediol.

The activation temperature of the cationic initiators is usually above room temperature and is preferably in the range from 60 to 180° C., especially from 90 to 150° C.

The amount of cationic initiator present in the cationically curable epoxy resin is usually from 0.05 to 20% by weight, preferably from 0.5 to 15% by weight, based on the amount of cationically polymerisable material, for example the epoxy resin.

The one-pot liquid resin systems are prepared in known manner by mixing the cationic initiator into the cationically polymerisable material by means of stirring at room temperature or at a slightly elevated temperature of up to approximately 40° C. The one-pot liquid resin system used for the method according to the invention preferably has a viscosity of from 10 to 1000 mPa·s, especially from 200 to 500 mPa·s, at the spraying temperature. Coloured coatings can also be obtained when pigments, for example Irgalite ® Green GFNP, Chromopthal® Blue 4GNP and Chromopthal® Red (all Ciba Spezialitatenchemie), are added to the liquid resin system. The proportion of pigment is preferably from 0.5 to 2% by weight, especially 1% by weight, based on the liquid resin system.

In the method according to the invention, the one-pot liquid resin system is usually injected into the fluidised-bed coater at a spraying temperature of from room temperature to 150° C. The spraying temperature is preferably from 50 to 120° C., especially from 70 to 100° C. The spray resin formulation can be injected into the fluidised-bed coater optionally from below ("bottom-spray" method), laterally or from above ("top-spray" method). The latter has the advantage that a simplified apparatus arrangement can be used. The parameters to be set for spraying the liquid resin into the fluidised-bed coater, for example the spray pressure and the spraying time, are highly dependent on the characteristics of the material (such as the density, the bulk weight and especially the amount of the material to be coated) but can be set by the person skilled in the art without problems.

The one-pot liquid resin systems used in the method according to the invention are preferably those having a gelling time of from 5 to 30 seconds at from 110 to 140° C., especially those having a gelling time of from 10 to 20 seconds at from 120 to 140° C.

The substrate to be coated according to the method of the invention is preferably heated before being sprayed with the one-pot liquid resin system. The heating may be carried out when the substrate is being fluidised in the fluidising coater itself or may be carried out separately by heating in an oven. Preferably, the substrate to be coated is heated to a temperature above 80° C., especially above 100° C., more especially above 120° C., but not above a maximum of 200° C., before being coated.

As mentioned at the beginning, the coated substrates obtained in accordance with the method of the invention have several advantages. The method according to the invention allows the preparation of coated substrates having a reduced bulk weight that can be set in defined manner and an E modulus in compression that can be set accordingly. Furthermore the method according to the invention yields homogeneous coatings, the thickness of which can advantageously be set with in a range from approximately 1% to 100%, based on the uncoated substrate diameter. Furthermore, in order to provide simple visual differentiation between different coating thicknesses or bulk densities, differently coloured coatings can be prepared by selecting different pigments.

The method according to the invention can be used, for example, for applying to fluidisable substrates electrically conductive coatings (by adding a metal powder, the coatings other-wise being dielectric), anti-corrosive coatings, anti-diffusion coatings or so-called "spacer" coatings (for reducing the degree of filling of a filled system with the possible effect of controlling the mechanical characteristics according to the method of the invention). The resulting coated substrates can also be used, for example, in epoxy resin formulations or in powder coating compositions, for example in the form of mouldings.

Preparation of a coating formulation

In a flat-ground flask fitted with an anchor stirrer, 172.54 g of N-benzylquinolinium hexafluoroantimonate and 277.25 g of 1,1,2,2-tetraphenyl-1,2-ethanediol are added to 9546.0 g of 3,4-epoxycyclohexylmethyl-3',4'-epoxycyclohexanecarboxylate and the mixture is stirred at room temperature (RT) f or 24 hours (h) to yield a homogeneous, yellow-orange coloured resin/initiator solution having a gelling time of 15 seconds (sec) at 140° C.

EXAMPLE 1

3000 g of a spherical ceramic filler having a diameter of from 1.5 to 2.5 mm and comprising approximately 85% by weight $Al_2O_3$ (Stemalox, Hoechst-Ceramtec) are pre-heated to 200° C. in a drying cabinet, then placed in a fluidised-bed coater (Precision Coater MP-1, Aeromatic-Fielder) and fluidised in an inlet air stream of 75 $m^3$/h having an inlet air temperature of approximately 150° C. Immediately thereafter, the coating formulation described above is sprayed in from below ("bottom-spray" method) through a binary nozzle. The spraying air temperature is approximately 75° C. and the spray pressure is $4.0 \cdot 10^5$ Pa. The spraying rate is increased from 1.2 gsmin initially to 5.6 g/min. The total spraying time is 75 min, and the total amount of coating formulation sprayed is 300 g. The coated ceramic filler is light ivory-coloured and has the following characteristics:

| | |
|---|---|
| Coating thickness, determined by optical microscopy | 39 $\mu$m |
| Density of the coating | 1.03 g/cm$^3$ |
| True density of the coated ceramic filler | 3.070 g/cm$^3$ |
| Bulk density of the coated ceramic filler | 1.76 g/cm$^3$. |

The E modulus in compression of an epoxy resin test specimen filled with 60% by weight ceramic filler falls from 20 700 MPa when the epoxy resin test specimen is filled with uncoated ceramic filler to 16 700 MPa when the epoxy resin test specimen is filled with coated ceramic filler.

The epoxy resin test specimen for the measurement of the E modulus in compression is obtained by thoroughly mixing 40 g of a curable epoxy resin matrix with 60 g of the coated ceramic filler, filling the mixture into a test specimen mould and then fully curing for 3 hours at 120° C.

The curable epoxy resin matrix is a mixture of:

100 parts by weight of a diglycidyl ether of bisphenol A having an epoxy content of from 5.1 to 5.3 equiv./kg (obtainable under the tradename Araldit® from Ciba Spezialitattenchemie) 100 parts by weight of an epoxy resin mixture having an epoxy content of 2.5 equiv./kg and containing 32 parts by weight of diglycidyl ether of bisphenol A and 68 parts by weight of diglycidyl ether of polypropylene glycol(400) (obtainable under the tradename Araldit® CY 208 from Ciba Spezialitatenchemie), 150 parts by weight of a mixture of hexahydrophthalic acid anhydride, tetrahydrophthalic acid anhydride and phthalic acid anhydride (obtainable under the tradename Harter HY 905 from Ciba Spezialitatenchemie) and 1 part by weight of the accelerator based on 2,4,6-tris(dimethylamino) methylphenol (obtainable under the tradename Beschleuniger DY 061 from Ciba Spezialita.tenchemie).

EXAMPLE 2

The method described in Example 1 is repeated, but the spraying time is increased from 75 min to 212 min so that the total amount sprayed is in this case 1128 g/min. The coated ceramic filler is dark ivory-coloured and has the following characteristics;

| | |
|---|---|
| Coating thickness, determined by optical microscopy | 161 $\mu$m |
| Density of the coating | 1.03 g/cm$^3$ |
| True density of the coated ceramic filler | 2.545 g/cm$^3$ |
| Bulk density of the coated ceramic filler | 1.56 g/cm$^3$. |

The E modulus in compression of an epoxy resin test specimen filled with 60% by weight ceramic filler falls from 20 700 MPa when the epoxy resin test specimen is filled with uncoated ceramic filler to 8 000 MPa when the epoxy resin test specimen is filled with coated ceramic filler.

The epoxy resin test specimen is prepared as described in Example 1.

EXAMPLE 3

3000 g of a spherical ceramic filler having a diameter of from 1.5 to 2.5 mm and comprising approximately 85% by weight Al$_2$O$_3$ (Stemalox, Hoechst-Ceramtec) are placed in a fluidised-bed coater (Precision Coater MP-1, Aeromatic-Fielder) and fluidised in an inlet air stream of 75 m$^3$/h having an inlet air temperature of approximately 150° C. for approximately 60 minutes (min) until the temperature of the particles has risen to approximately 120° C. The coating formulation described above is then sprayed in from below ("bottom-spray" method) through a binary nozzle. The spraying air temperature is approximately 80° C. and the spray pressure is 4.0·105 Pa. The spraying rate is increased from 0.9 g/min initially to 5.5 g/min. The total spraying time is 120 min, and the total amount of coating formulation sprayed is 323 g. The coated ceramic filler is greenish-grey coloured and has the following characteristics:

| | |
|---|---|
| Coating thickness, determined by optical microscopy | 57 µm |
| Density of the coating | 1.28 g/cm$^3$ |
| True density of the coated ceramic filler | 3.006 g/cm$^3$ |
| Bulk density of the coated ceramic filler | 1.79 g/cm$^3$. |

The E modulus in compression of an epoxy resin test specimen filled with 60% by weight ceramic filler falls from 20 700 MPa when the epoxy resin test specimen is filled with uncoated ceramic filler to 14 700 MPa when the epoxy resin test specimen is filled with coated ceramic filler.

The epoxy resin test specimen is prepared as described in Example 1.

Examples 4–7 (Application Examples using coloured spray formulations) The method described in Example 1 is repeated, but in each case 1% by weight pigment is added to the spray formulation described above.

The physical data of the coloured ceramic filler specimens obtained are comparable to those of the uncoloured ceramic filler specimens obtained from Example 1.

EXAMPLE 4

Irgalit® Green GFNP (Ciba Spezialitatenchemie) is used as pigment. The coated ceramic filler has a very homogeneous deep-green colour.

EXAMPLE 5

Chromopthal® Blue 4GNP (Ciba Spezialitatenchemie) is used as pigment. The coated ceramic filler has a very homogeneous deep-blue colour.

EXAMPLE 6

Chromopthal® Yellow 3G (Ciba Spezialitatenchemie) is used as pigment. The coated ceramic filler has a very homogeneous deep-yellow colour.

EXAMPLE 7

Chromopthal® Red (Ciba Spezialitatenchemie) is used as pigment. The coated ceramic filler has a very homogeneous deep-red colour.

EXAMPLE 8 ("top-spray" method variant)

The method described in Example 1 is repeated except for the spray arrangement used, 1% by weight Chromopthal® Red pigment (Ciba Spezialititenchemie) being added to the spray formulation described above, as in Example 7.

Instead of the "bottom-spray" method used in Examples 1 to 7, the spray formulation is sprayed from above according to the "top-spray" method through a binary nozzle onto the ceramic beads being fluidised.

Ceramic beads having a very homogeneous coating and an intense red colour are obtained. The physical data of the coloured ceramic filler specimens are comparable to those from Example 1.

What is claimed is:

1. A method for the reactive coating or reactive encapsulation of fluidisable, organic or inorganic, anisotropic or isotropic substrates with a cross-linking, thermostable and insoluble thermoset by spraying onto substrates a cationically curing one-pot liquid resin system comprising a cationic initiator, which method comprises fluidising the substrates in a fluidised-bed coater at a temperature above the activation temperature of the cationic initiator and then injecting the one-pot liquid resin system into the fluidising coater through a spraying device, the one-pot liquid resin system used having a gelling time of from 1 to 60 seconds at from 100 to 150° C., wherein coatings that are cross-linked on the particles are obtained without agglomeration of the individual coated particles while the coating is being cross-linked.

2. A method according to claim 1, wherein an inorganic material is used as the substrate to be coated.

3. A method according to claim 1, wherein a mineral material is used as the substrate to be coated.

4. A method according to claim 1, wherein a ceramic material is used as the substrate to be coated.

5. A method according to claim 1, wherein a curable epoxy resin comprising a cationic initiator is used as the one-pot liquid resin system.

6. A method according to claim 5, wherein a cycloaliphatic epoxy resin is used as the curable epoxy resin.

7. A method according to claim 1, wherein a thermally activatable initiator that does not contain nucleophilic anions is used as the cationic initiator.

8. A method according to claim 7, wherein a thermally activatable initiator having complex halide anions is used.

9. A method according to claim 7, wherein a quaternary ammonium salt is used as the thermally activatable initiator.

10. A method according to claim 9, wherein there is used N-benzylquinolinium hexafluoro-antimonate as the quaternary ammonium salt, together with 1,1,2,2-tetraphenyl-1,2-ethanediol.

11. A method according to claim 1, wherein the substrate to be coated is heated to a temperature above 80° C.

12. A. method according to claim 1, wherein the substrate to be coated is heated to a temperature above 100° C.

13. A method according to claim 1, wherein the substrate to be coated is heated to a temperature above 120° C.

14. The unagglomerated coated substrates obtained in accordance with the method of claim 1.

* * * * *